June 21, 1960

F. B. COKER

2,942,180

MAGNETIC FIELD MEASURING SYSTEM

Filed Nov. 12, 1953

FRANK B. COKER,
INVENTOR.

BY
ATTORNEY

United States Patent Office 2,942,180
Patented June 21, 1960

2,942,180

MAGNETIC FIELD MEASURING SYSTEM

Frank B. Coker, Monterey Park, Calif., assignor, by mesne assignments, to United Geophysical Corporation, Pasadena, Calif., a corporation of California Filed Nov. 12, 1953, Ser. No. 391,576

22 Claims. (Cl. 324—43)

This invention relates to improvements in magnetometers, and more particularly to improvements in circuits for measuring the strengths of magnetic fields by means of flux-gate magnetometers.

Magnetometers of the flux-gate type have been employed to detect and measure small differences in the strength of the earth's magnetic field as the magnetometers have been flown by airplanes in order to rapidly survey the earth's magnetic field along the course of flight. Such surveys often exhibit anomalies that indicate the presence of some object or formation that has modified the earth's magnetic field locally. When the flight is over water, the anomaly is usually employed to indicate the presence of a submarine or other metallic sea-going vessel. In other cases, whether the flight is over the sea or over land, such anomalies aid in determining the location of geologic formations that are likely to contain valuable mineral deposits such as oil or metallic ores. The strength of the earth's magnetic field is of the order of 0.5 gauss. Significant differences in the strength of the magnetic field in such an anomalous area are often of the order of less than 0.1% of the earth's field and are so small compared to the total strength of the earth's magnetic field that the measurements of the field strength are usually expressed in $\gamma$, wherein $1\gamma = 10^{-5}$ gauss.

Because of the fact that such small differences in the strength of the magnetic field may be significant, it is important that the magnetometer employed for its measurement be very sensitive and also very stable. Unless it is sensitive, small, significant anomalies may not be detected at all. Unless it is stable, the measurements may be masked by long term fluctuations sometimes called "drift" or by random rapid variations, sometimes called "noise" or by other spurious indications.

While it is desirable that a magnetometer be capable of measuring and indicating accurately large differences in magnetic field strengths between various points, such as differences of about $10,000\gamma$ or more, it is also desirable that the magnetometer indicate accurately differences in strength of the order of $1\gamma$.

In a magnetometer of the type to which the present invention is applicable, two magnetometer elements are connected in opposing arms of an unbalanced bridge circuit or other unbalanced circuit. The magnetometer elements may be in the form of magnetic cores with coils wound thereon or in the form of a single core with two coils wounds thereon. In either event, the axes of the two elements are parallel or even coincident. The cores are composed of ferro-magnetic material having high permeability and a B-H curve which exhibits a sharp knee at the saturation point.

When an alternating current is applied to the input of such a bridge circuit and the current is of a magnitude sufficient to drive the magnetometer elements with more than enough magnetomotive force to saturate them in each half-cycle of operation, series of alternate positive and negative pulses appear at the output of the bridge circuit. The arithmetic sum of the amplitudes of the pulses is substantially constant irrespective of substantial changes in the strength of the magnetic field to which the magnetometer is exposed. However, the arithmetic difference between the amplitudes of the pulses is proportional to the strength of the component of the magnetic field which lies along the axes of the elements.

In such systems that have been employed heretofore for rectifying the positive and negative pulses, and measuring the differences between their amplitudes, the two sets of pulses have been amplified and rectified in two separate but parallel channels of a bridge output measuring circuit. More particularly, in one such system the two sets of pulses have been passed through a pair of corresponding Class C amplifiers which served to amplify and rectify the pulses. The outputs of the two Class C amplifiers were then independently amplified in separate D.C. amplifiers and the difference between the outputs thereof was measured to determine the magnetic field strength. In another such system the two sets of pulses have been passed through two separate Class B amplifiers, each of which has included one or more voltage amplifying thermionic tubes. The outputs of the Class B amfiers were then impressed upon separate rectifiers, each of which included its own diode. The separate rectified signals were then passed through separate D.C. amplifiers, each also including at least one thermionic amplifying tube, and the difference between the outputs of the two D.C. amplifiers was measured to indicate the magnetic field strength.

Both of the prior art systems just described are subject to the inherent disadvantage that any slight unbalance existing between the channels employed to amplify the separate trains of pulses, produces a spurious change in the output which would be interpreted as a change in magnetic field strength. Furthermore, the D.C. amplifiers present an even more difficult problem since drift and unbalance therein is virtually unavoidable and when present produces similar spurious indications in the output. Such unbalance or drift might arise because of spontaneous changes in the supply voltages or in the characteristics of the individual amplifier tubes in the different channels or because of slight differences in the heating characteristics of the cathodes, or because of ambient temperature changes which affect the values of the various components employed in the electrical circuits, the latter two causes being particularly significant during the period when the equipment is being warmed up after being energized for operation. By way of example, it is to be noted that the drift due to changes occurring during the warm-up period alone in such systems corresponds to a change in the magnetic field strength of as much as $1,000\gamma$ or more per hour. Furthermore, with either of such systems large shifts in the output are likely to occur when amplifier tubes are replaced, and both systems are subject to appreciable drifts due to changes in temperature and supply voltages.

In practice, a compensating magnetic field is arranged to neutralize the component of the ambient magnetic to field of the earth which is to be measured. In some such systems the compensating magnetic field is produced by two currents one of which is controlled by the output from the bridge amplifying system and the other of which is supplied from an independent source. In this case, the two currents are measured to indicate the strength of the compensating field. In another system disclosed and claimed in copending patent application Serial No. 391,575, filed by Frank B. Coker, on November 12, 1953, a single current produced by the output from the bridge amplifying system is employed to produce the compensating magnetic field, and the amplitude of this current is measured to indicate the strength of the compensating field. In either case, the compensating field is adjusted to produce zero output in the bridge measuring circuit. Assuming then that such zero output indicates equality of the compensating and ambient fields, the strength of the compensating field is measured to indicate the strength of the ambient field. From the foregoing discussion however, it is apparent that when the output of the bridge measuring circuit is zero, the two magnetic fields are unequal, if the two amplifying and rectifying channels of the measuring circuit do not amplify positive and negative pulses equally. Furthermore, the output of the measuring circuit shifts if any changes occur in the two voltage amplifying and rectifying channels thus introducing a spurious indication of a non-occurring change in field strength.

When such a magnetometer is employed to measure the total magnetic field instead of only a single component thereof, the magnetometer system may employ three sets of magnetometer elements arranged along three mutually perpendicular axes. Two sets of the magnetometer elements, called orientor elements, are employed to orient the third set of magnetometer elements, called detector elements, along the magnetic field to be measured. In order to accomplish the desired orientation, outputs from unbalanced bridge circuits including the respective sets of orienting elements are passed through amplifying systems of the type described above and the outputs thereof are employed to rotate the unit to a position in which axes of the sets of orientor elements are perpendicular to the magnetic field. In this case an error in orientation may occur because of a change in the characteristics of the amplifying system. Ordinarily however, this problem is not so serious, because small errors in orientation do not greatly affect the accuracy of the measurement of the total strength of the magnetic field by means of the detector elements. By way of example, it has been determined that in a total field of 50,000γ a 1° error in orientation produces an error in the output of the detector element of only 8γ. In such a magnetic field a 1° error in orientation corresponds to a field strength of 870γ along the axis of a pair of orienting elements. Thus, if an 870γ error occurs in the balance of the control system of a pair of orienting elements, only an 8γ error occurs in the measurement of the magnetic field. It is thus seen that while high accuracy is required in the orientation circuits, a much higher accuracy is required in the measuring circuits associated with the detector element. In practice, the orientation accuracy of such systems is usually somewhat better than 1° and thus the measurement errors introduced thereby are usually smaller than 8γ.

An object of this invention is to provide an improved system for detecting and measuring the output of an unbalanced magnetometer circuit of the type described, which overcomes the disadvantages of the systems employed heretofore and which, more particularly, produces indications of magnetic field strength which are more accurate and reliable and which are free of long-term drifts or random fluctuations and in which circuit elements may be replaced by similar elements having nominally the same characteristics without introducing large errors.

Another object of the invention is to provide a magnetic field measuring system of the type described which employs feed-back to produce a compensating magnetic field and in which the magnitude of the compensating magnetic field is substantially independent of the amplitude of the carrier wave supplied to the magnetometer elements.

The foregoing and other objects of the invention, together with various advantages thereof, will be set forth in the following description of specific embodiments thereof. While the invention is illustrated and described with reference to only a few embodiments thereof and with reference only to certain applications, it will be understood that it may be embodied in other forms within the scope of the appended claims and that it may be applied in other ways.

*General*

Figure 1:
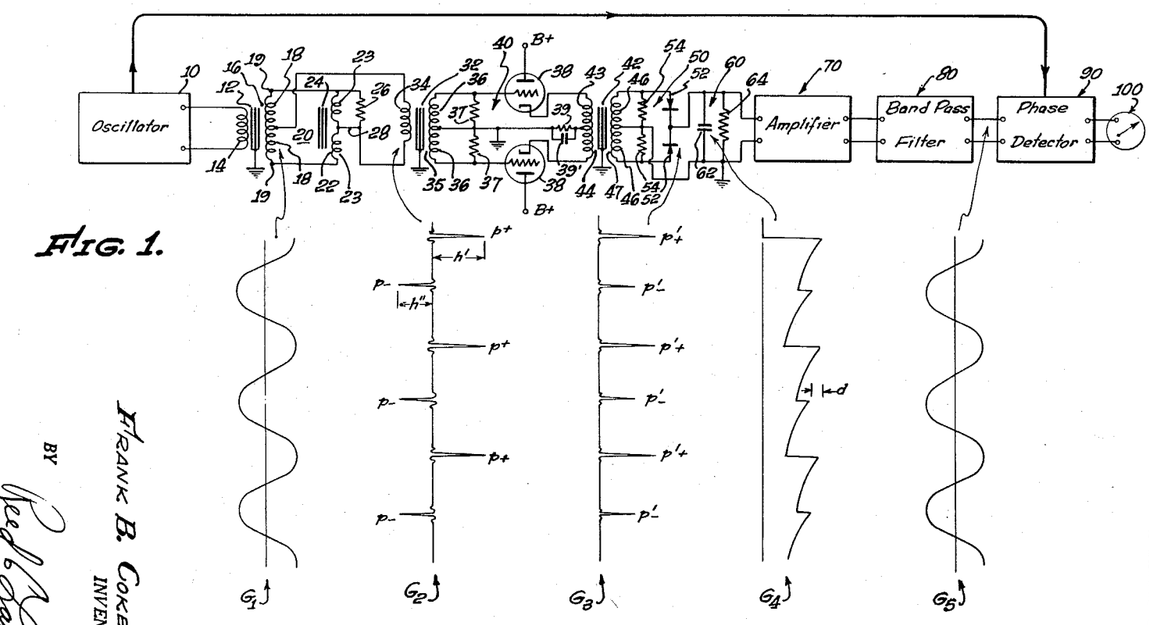
Fig. 1 is a circuit diagram of one embodiment of the invention.

According to the present invention the output of an unbalanced flux-gate magnetometer bridge circuit is passed through a Class A amplifier and the output of the amplifier is impressed upon a full-wave rectifier, the output of which is then amplified, filtered, and measured. In the system illustrated in Fig. 1, the amplifier is of the push-pull type; while in the system of Fig. 2, the amplifier is of the single-ended type. In the system of Fig. 1 the tubes are cathode-loaded so that no voltage amplification occurs in them though there is power amplification. But, in the system of Fig. 2 only one tube is employed in the amplifier and it is connected so that some voltage amplification as well as power amplification occurs. In either event, as explained more fully hereinafter, both the positive and negative pulses appearing at the output of the bridge circuit are amplified substantially equally, irrespective of changes in characteristics of the tubes of the respective amplifier circuits, and irrespective of any drifts in the thermionic emission of the tubes in the circuits, and irrespective of slight variations in the characteristics of similar replacement tubes, so that accurate reproducible output signals are created.

In this specification, the phrase "unbalanced bridge circuit" is employed herein to refer to a magnetometer bridge circuit operated in an electrically "unbalanced" manner. Such unbalance may be achieved for example, by associating with one of the magnetometer energizing coils thereof an external impedance which, in the absence of an external ambient magnetic field, unbalances the bridge in such a manner that a series of positive and negative pulses of voltage of equal amplitude is produced at the output thereof. Such unbalance of the bridge circuit may also be produced by providing different numbers of turns on the magnetometer energizing coils. When operated in an unbalanced condition, the difference between the amplitudes of the positive and negative pulses at the magnetometer bridge output is proportional to the ambient magnetic field existing at the magnetometer elements.

*Push-pull cathode-loaded system*

Referring more particularly to Fig. 1 there is illustrated an embodiment of the invention in which alternating current of substantially constant carrier frequency and amplitude is applied by an oscillator 10 across the input of a bridge circuit 20 through a first iron-core transformer 12 having a primary winding 14 and a center-tapped secondary winding 16. A carrier frequency commonly employed is 400 cycles per second (c.p.s.). The arms in one branch of the bridge circuit 20 are formed by the two sections 18 of the secondary winding 16 and the input of the bridge is located, in effect, across the outer terminals 19 of the secondary winding. The arms of the remaining branch of the bridge circuit 20 are formed by two magnetometer elements 22 which are formed by separate spaced-apart windings 23 having the same number of turns on a common magnetic core 24 that is in the form of a bar composed of one or more thin strips or laminations of ferromagnetic material of the type described above. A resistor 26 connected across one of the windings 23 serves to unbalance the bridge as herein before described. The primary winding 34 of a second iron-core transformer 32 is connected across the output of the bridge formed by the center tap 27 of the secondary winding 16 and the junction 28 between the two magnetometer windings 23.

The two halves 36 of a center-tapped secondary winding 35 of the second transformer 32 are connected in the respective input circuits of two amplifier tubes 38, and load resistors 37 are connected across the separate halves 36 in order to assure proper loading of the transformer 32. The center tap of the secondary winding 35 and the junction between the two input resistors 37 are grounded. The two halves 43 of a center-tapped primary winding 44 of an output transformer 42 are connected in respective cathode circuits of the two amplifier tubes 38. A cathode bias resistor 39 and a by-pass condenser 39' are connected in parallel between the center tap of the primary winding 44 and ground. Substantially the entire impedance of each of the cathode circuits of each of the amplifier tubes 38 is formed by a half 43 of the primary winding 44 so that voltages appearing across the respective halves 36 of the secondary winding at 37 are impressed equally and without any substantial voltage amplification or attenuation across the corresponding halves 43 of the primary winding 44. The tubes 38 and the grid and cathode circuits associated therewith form a push-pull cathode-follower Class A power amplifier 40. The two halves of a full-wave rectifier 50 that comprises a pair of diodes 52 are connected across the two halves 46 of the secondary winding 47 of the third transformer 42. Resistors 54 are connected across the respective halves of the secondary winding 47. The full-wave rectifier 50 includes at its output a charging circuit 60 formed by a condenser 62 and a resistor 64 connected in parallel between the center tap of the secondary winding 47 and the junction between the two diodes 52.

Signals appearing across the charging circuit 60 are passed through an alternating current amplifier 70 and a band-pass filter 80 to a phase detector 90 and thence to a measuring device 100 that may be in the form of a voltmeter. Reference voltage waves from the oscillator 10 are also supplied to the phase detector 90. Such a detector has the characteristic that it produces at its output a D.C. voltage which is proportional to the amplitude of the A.C. signal applied to its input, and the sign of the output voltage reverses when the phase of the input signal is reversed. This result occurs if the waves applied to the input are of the same frequency as the reference voltage waves and are of smaller amplitude than the latter.

In order to measure the strength of a component of a magnetic field, the magnetic axis of the core 24 is aligned with the direction of the component in question. The alignment may be accomplished, for example, by suspending the core 24 on a pendulum or a vertically oriented gyroscope, if it is desired to measure a vertical component of the earth's magnetic field. Or, it may be aligned automatically by means of suitable self-orienting devices along the direction of the earth's magnetic field, if it is desired to measure the total strength of the earth's field. Likewise, of course, to measure any component of any other magnetic field, the core 24 is aligned therewith in some suitable manner.

To facilitate understanding the operation of the system, a series of time-coordinated graphs, $G_1$, $G_2$, $G_3$, $G_4$, and $G_5$, are employed in Fig. 1 to represent events occurring substantially simultaneously in different parts of the circuit.

With the core 24 suitably aligned along the axis of the component of the magnetic field to be measured, when a sinusoidal A.C. voltage represented by the graph $G_1$ is applied to the input of the bridge circuit 20, alternate series of positive pulses $p+$ and negative pulses $p-$ represented in graph $G_2$, are produced at the output of the bridge circuit and are impressed upon the primary winding 34 of the bridge output transformer 32. The voltage pulses thus appearing across the output of the bridge circuit 20 are amplified by the transformer 32 and the resultant amplified voltages appear in the grid circuits of the amplifier tubes 38.

Here it is to be noted that both the positive and negative pulses appear across each of the two halves 36 of the secondary winding 37 and that both the positive pulses and the negative pulses are amplified by each of the two tubes 38. Due to the push-pull cathode-follower connections in the amplifier 40, the voltage amplification or gain as measured between the windings 36 and the corresponding windings 43 is slightly less than unity. The cathode biasing resistor 39 and parallel by-pass capacitor 39' have very little effect upon the gain of this amplifying stage 40 except to provide a bias for the Class A operation of the tubes 38. This is due to the push-pull nature of the cathode circuits including tubes 38 and the respective halves 43 of the winding 44 connected thereto. With this arrangement at any instant during the cycle of the amplification of a pulse in the amplifier 40, substantially equal and opposite currents in the two cathode circuits flow in the bias resistor 39, resulting in a substantially constant bias.

Considerable power amplification is provided by the amplifying stage 40 due to the fact that the impedances seen looking into the windings 43 of transformer 42 are much smaller than the impedances seen looking into the corresponding secondary windings 36 of the transformer 32, and as previously stated, substantially unity voltage gain is provided between these two windings. Thus, the input transformer 32 provides a substantial amplification of the voltage supplied by the bridge circuit 20, while the amplifier tube and associated networks provide substantial power amplification of the amplified voltage signals.

The amplifier 40 with its input transformer 32 and output transformer 42 acts as a buffer or isolation stage between the highly sensitive bridge circuit 20 and the very non-linear rectifier circuit 50 with its charging circuit 60. Such isolation facilitates very accurate work, since it precludes variations in the sensitivity of the magnetometer bridge 20 that would otherwise occur because of variations in the impedance of the load across the output of the bridge circuit 20. Constancy of bridge sensitivity is attained in the present invention by providing as a load for the bridge circuit 20 the substantially constant impedance offered by the primary winding 34 of the transformer 32. It is to be noted that this impedance is not affected by the amplitudes of the pulses being amplified by the amplifier stage 40 since the tubes 38 are biased to operate in the Class A region at all times.

Furthermore, the amplifier 40 amplifies the positive and negative pulses without introducing any substantial relative distortion. This is very important since, as will be seen later, a slight distortion introduced in the amplification of the tips or top portions of the positive pulses as compared to the amplification of the tips, or bottom portions of the negative pulses may produce spurious indications in the output of the systems.

As explained herein above the sum of the amplitudes $h'$ and $h''$ of the positive and negative peaks respectively, is substantially constant even though the strength of the magnetic field varies, and the difference between them is proportional to the strength H of the magnetic field. Thus $$h'+h'' \cong \text{constant} \qquad (1)$$
$$h'-h'' = aH \qquad (2)$$

where $a = \text{constant}$.

Besides expressing the idea of proportionality, Equation 2 expresses the idea that if the component of the magnetic field is zero, the difference in amplitudes between the positive and negative pulses at the output of the bridge circuit is zero and that the sign of the algebraic value of the difference $h'-h''$ depends upon the direction of the component relative to a reference direction along the core 24.

When the amplified output from the push-pull amplifier 40 is impressed upon the full-wave rectifier 50, the positive pulses p+ and the negative pulses p− are converted to voltage pulses of one polarity only as indicated in graph G₃. Here to emphasize the unilateral characteristic of the output from the rectifier elements 52, no account has been taken of the effect of the charging circuit 60 on the voltage. Thus the pulses p'+ and p'− represent more nearly the voltage that would flow in the output of the bridge circuit if the output circuit were purely resistive.

In practice, the resistance 64 of the charging circuit 60 is large compared to the forward resistances of either of the diodes 52 so that variations or changes that occur in the values of the resistances of the diodes 52 do not substantially affect the relative amplitudes of the large and small pulses appearing in the output of the full-wave rectifier 50. Furthermore, the time-constant of the charging circuit 60 is greater than about the period of the waves supplied by the oscillator 10. Thus, the voltage appearing across the charging circuit 60 is actually in the form of a saw-tooth wave in which alternate peaks are large and small, as shown in graph G₄. Moreover, the heights of the alternate peaks are substantially equal to the heights of the respective alternate pulses of graph G₃. With this arrangement, within the range of operation of the system, the difference $d$ in voltage between the large and small peaks of the saw-tooth wave is proportional to the difference in amplitude between the positive pulses $p+$ and $p-$ generated at the output of the bridge circuit 20 and is thus proportional to the strength of the component of the magnetic field to which the core 24 is exposed.

In case a compensating magnetic field is employed to balance out a large portion of the earth's magnetic field as hereinafter explained, the net magnetic field that is to be measured is very small, as expressed by the equation $$\frac{h'-h''}{h'+h''} \ll 1$$

In such case the time constant of the charging circuit is made greater than about ten times the period of the oscillator. By employing such a long time-constant, the amplitude of signals impressed on any tubes in the amplifier 70 may be limited to values that are large compared with the voltage difference $d$ that is to be amplified but are very small compared with the amplitudes of the individual peaks $p+$ and $p-$. This makes it possible to employ an amplifier 70 of narrower amplitude range than would be required otherwise and also keeps the harmonic content of the saw-tooth wave relatively low.

It will be noted that the period of the saw-tooth wave G₄ is the same as the period of the wave supplied by the oscillator 10. It can be shown that the amplitude of the sinusoidal Fourier component of the saw-tooth wave of this frequency is proportional to the difference in amplitudes between the successive peaks thereof and therefore to the difference in amplitudes between the positive pulses $p+$ and the negative pulses $p-$. Thus the amplitudes of the harmonic component of fundamental frequency of the saw-tooth wave is proportional to the strength of the component of the magnetic field being measured. Furthermore, it can be shown that the polarity or phase of the harmonic component of the saw-tooth signal represented by graph G₄ depends upon the sense of the magnetic field present at the magnetometer element 24. For example, when the sense of this magnetic field is reversed, it is found that the phase of the fundamental harmonic component of the saw-tooth wave present across the charging circuit 60 is reversed by 180°. Thus the amplitude of this harmonic component provides a direct indication of the magnitude of the magnetic field present at the element 24 while the phase of this component provides a direct indication of the direction or sense of the magnetic field at the element 24.

It should be noted that the amplitude of the harmonic component of the saw-tooth wave whose frequency equals that of the oscillator 10 is somewhat dependent upon any difference in shape between the tips of the peaks of the saw-tooth wave. Thus, for example, if the heights of the successive peaks of the saw-tooth wave G₄ are identical, no fundamental frequency component would normally exist if the peaks are of the same shape. However, if the shapes of the tips of the successive peaks are not identical, there will be a fundamental frequency component present even if the amplitudes of the pulses are the same. This fact emphasizes the importance of maintaining distortionless amplification, at least at the tip of the peaks in order to prevent the introduction of such spurious indications. Furthermore, the rectification system described provides almost distortionless rectification of the positive and negative pulses due to the high impedance of the charging circuit 60 as compared with the forward resistance of the diodes 52, and the output impedance of the windings 46 of the transformer 42. These features all contribute to the extremely high accuracy and stability which is attained with the present invention.

It can also be shown that the higher frequency harmonic components present in the saw-tooth wave have frequencies that are integral multiples of the fundamental frequency and that they are of high amplitude compared with the fundamental frequency component. The amplitude of the second harmonic may be as much as 60 db above the fundamental frequency and higher frequency harmonics are of diminishing amplitude, the amplitude of such higher harmonics decreasing approximately 6 db per octave.

According to this invention the saw-tooth wave is amplified by an amplifier 70 and is passed through a band-pass filter 80 which is adapted to pass waves of frequency equal to the fundamental frequency of the saw-tooth wave without any substantial attenuation but is adapted to attenuate waves of higher harmonic frequencies very highly. In practice, the band-pass filter 80 may be made of a series of filter sections and the amplifier 70 may comprise several stages and some of the sections of the band-pass filter 80 may be arranged between successive stages of the amplifier. After passing through the band-pass filter 80, the signal is applied to the phase detector 90 and the output of this detector is applied to the voltmeter 100. As hereinbefore described, the phase detector detects the presence, the amplitude, and the phase of the harmonic component applied thereto which is of the same frequency as the reference voltage supplied thereto by the oscillator 10. Thus, the output from the phase detector 90 provides a direct indication of both the magnitude and direction of the net magnetic field present at the magnetometer element 24. By employing a voltmeter of a type capable of indicating both positive and negative voltages, both the strength and direction of the magnetic field is indicated.

*Single-ended system*

Figure 2:
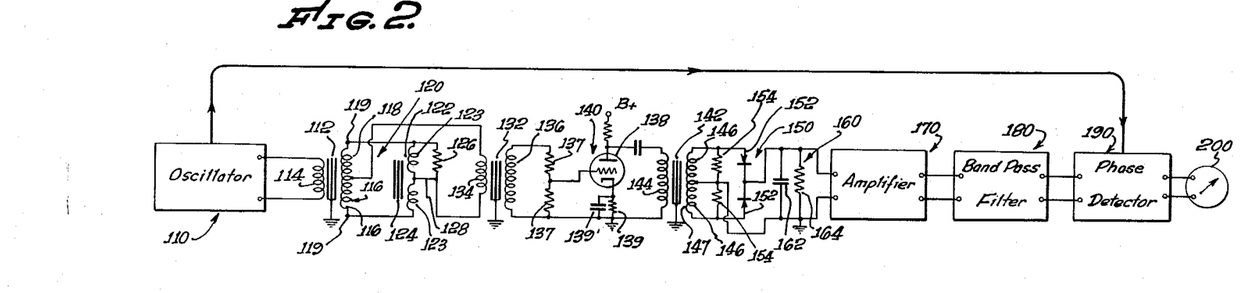
Fig. 2 is a circuit diagram of a second embodiment of the invention.

The embodiment of the invention illustrated in Fig. 2 is similar to that illustrated in Fig. 1 except that the push-pull amplifier 40 is replaced by a single-ended Class A power amplifier 140. Parts of the embodiment of the invention illustrated in Fig. 2 which are identical with or which correspond to those of the embodiment of Fig. 1 are indicated by the same numbers increased by 100.

In this embodiment of the invention the oscillator 110, the bridge 120, the rectifier 150, the charging circuit 160, the amplifier 170, the band-pass filter 180, the phase detector 190 and the meter 200 all have the same characteristics as the corresponding parts of the embodiment of Fig. 1.

In the amplifier 140 of Fig. 2, the entire output of the secondary winding 136 is applied to the grid of a single amplifier tube 138 and the output of the amplifier tube 138 is applied across the entire primary winding 144 of the third transformer 142. The amplifier tube 138 is biased by means of a cathode resistor 139 which is shunted by a by-pass condenser 139″ to such a value that the amplifier 140 operates as a Class A amplifier. In this case, if, for some reason, the characteristic of the tube 138 changes somewhat, the amplification factors associated with both positive and negative pulses are affected in about the same proportion. Thus, for example, if the amplification factor of the tube 138 changes by one percent, then the change in amplification of the positive pulses changes one percent and so also does the amplification of the negative pulses. As a result only a one percent change occurs in the output of the entire system as indicated by the meter 190. While it may be true that Class A amplifiers are not perfectly linear and that therefore, there might be some slight difference in the change in the amplification factor applicable to the pulses of opposite sign, nevertheless, by operating the tube 138 as a Class A amplifier excellent results are obtainable especially where the output of the system is employed to generate a compensating magnetic field at the core 124 as described hereinafter. In the latter case, the net magnetic field detected by the core is very small and hence the difference in amplitude between the positive and negative pulses that are applied to the grid of the amplifier tube 138 is also very small. Thus, in such a case, the possibility that a change in amplification of the amplifier tube 138 will produce a difference in amplification factor for positive and negative pulses is very unlikely, since it is relatively easy to set the bias at a point where the operation of the amplifier tube 138 shall be very nearly linear over at least a small range of amplitudes of both positive and negative pulses. Furthermore, in such a case distortion of the tips of the pulses is avoided, thus precluding the introduction of spurious effects from such cause.

Feed-back systems

Figure 3:
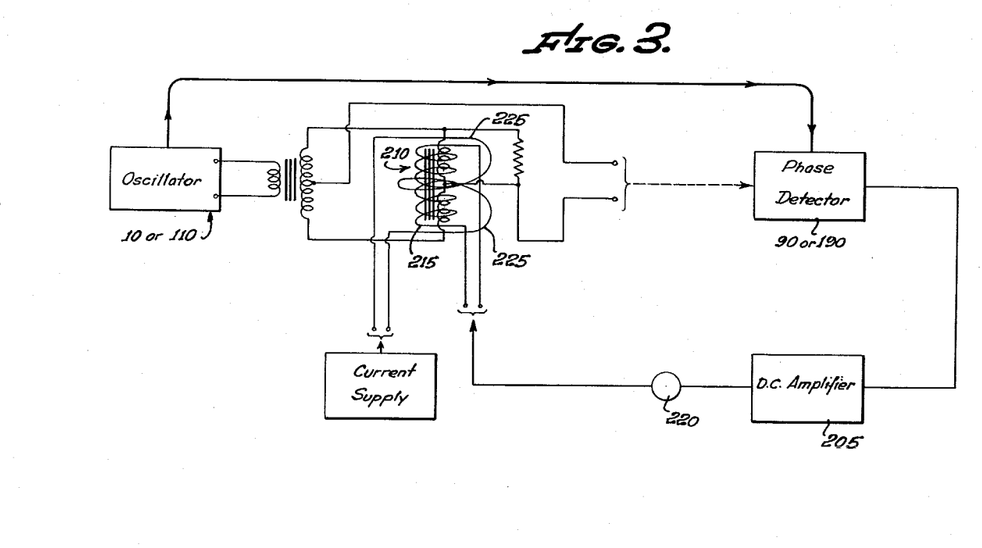
Fig. 3 is a diagram of a system embodying the invention and employing negative feed-back.

An arrangement for feeding back control current to produce a compensating magnetic field is illustrated schematically in Fig. 3. Here the output of the phase detector 90 or 190 of either of the foregoing embodiments of the invention is passed through a D.C. amplifier 205 to produce a direct current which is then applied to a Helmholtz coil 215, the current being measured by means of a suitable measuring device 220. An additional Helmholtz coil 225 is supplied with a constant current from a manually adjustable current source to balance out the main portion of the field. If the system described in said copending application Serial No. 391,575 is employed, the additional Helmholtz coil 225 may be omitted. In that system the compensating current is controlled by means of a servo-mechanism.

When feed-back is employed with the present system very stable operation may be attained. For example, when feed-back is employed with the system of Fig. 2, it is possible to reduce the drift occurring in the warm-up period to as little as 100γ per hour while with the system of Fig. 1, the drift may be reduced to as low as 10γ per hour.

A further highly advantageous feature provided by the embodiment of Fig. 3 is the fact that when used with feed-back, as indicated in Fig. 3, the amplifier 40 or 140 and the rectifier 50 or 150 and charging circuit 60 or 160 are substantially independent in their operation of changes in the amplitude of the driving current provided by the oscillator 10 or 110 to the bridge circuit 20 or 120. For example, a small increase in the amplitude of the output of oscillator 10 or 110 causes an increase in the amplitudes of both the positive and negative pulses produced by the bridge circuit 20 or 120 and amplified by the amplifier 40 or 140. The amplifier 40 or 140 will reproduce the pulses of increased amplitude with high fidelity and the rectifier circuit 50 or 150 and charging circuit 60 or 160 cooperate to produce a new voltage across the filter circuit 60 or 160 of a saw-tooth nature and of an increased peak amplitude. It will be found, however, that since the compensating field is maintained at a value which almost produces equality of pulse heights there will be no substantial disturbance in the measured compensating current as indicated by current meter 220. Thus the amplification system, as a whole, functions in a self-compensating fashion and in practice greatly reduces any effects at the output of the phase detector 90 or 190 which would otherwise be caused by changes in the amplitude of the bridge energizing current provided by the oscillator 10 or 110.

Conclusion

The invention described hereinbefore solves many of the problems attendant to the provision of an accurate and stable electronic magnetometer system. In order to more fully appreciate this fact, consider that when such a system is used to measure the magnetic field of the earth such as is done in the geophysical exploration for mineral deposits, it is desired to detect very small changes in the earth's magnetic field as the instrument is transported over the surface of the earth. Significant changes in the intensity of the earth's field from one point to another in the area surveyed may be as small as 1γ or, in other words, a change of 1 part in about 50,000 parts is to be measured. Thus in considering the measurement of such extremely small changes it becomes apparent that high accuracy and stability are necessary in the measuring equipment.

In practice, small changes in the magnetic field being measured cause correspondingly small changes in the relative heights of the positive and negative pulses produced by the bridge circuit 20 or 120. It will be apparent that, when such a train of pulses is passed through the amplifier 40 or 140 and is thereafter rectified by the rectifier 50 or 150, extremely slight changes in the amplification afforded the positive pulses as compared with that afforded the negative pulses, would produce corresponding changes in the relative heights of the successive rectified pulses. If such relative change in amplification were to occur, the relative change in successive pulse heights at the output of the rectifier 50 or 150 would be interpreted as a change in the magnetic field being measured by the bridge circuit 20 or 120, even though the magnetic field has not changed at all. Furthermore, if the rectification characteristics of half of the rectifier 50 or 150 were to alter appreciably from those of the other half, similar undesirable results might be produced and again an apparent signal would be obtained at the output even though no change in magnetic field had occurred at the magnetometer element 24 or 124. Thus it should be appreciated that in order to provide stable and accurate operation in the system, not only should the relative amplification and rectification applied to the positive pulses be substantially identical to that applied to the negative pulses, but, even more important, such amplification and rectification applied to the positive and negative pulses should remain extremely constant during the operation of the instrument.

These prerequisites for stable and accurate operation are found to exist in the present invention. Referring to the embodiment shown in Fig. 1 it is seen that the particular amplifier circuit 40 comprises a push-pull cathode follower amplifier, which employs 100% feed-back from the output to the input. It is well-known that cathode followers provide highly stabilized amplification due, in part, to the large proportion of the output which is fed back to the input. Furthermore, stabilized amplification of these pulses is achieved by employing a push-pull circuit in which the load circuit cathodes of the tubes 38 comprises the center-tapped primary winding 44 of transformer 42. This connection provides substantial cancellation of any even harmonic components which might otherwise be generated by the slight non-linearities of the tubes 38. Thus in the particular circuit, the slight non-linearities of the amplifying tubes 38 are balanced out due to the push-pull connection in the cathode circuit thereof, and furthermore, the 100% feed-back feature of the cathode-follower connection provides high stabilization of the gains provided by the two amplifying tubes 38. Thus the amplifier 40 is not only a Class A amplifier but it is also a highly stabilized version thereof and one which introduces virtually no amplitude distortion. Even in view of the advantageous features of the amplifier 40 of Fig. 1, nevertheless, some of the features thereof are also present in the amplifier 140 of Fig. 2, although to a lesser degree.

In both systems the use of Class A operation provides practically distortionless amplification of the positive and negative pulses thus making high accuracy and high stability possible.

In regard to the stability of the rectification circuit 50 or 150, in practice the output impedance of the windings 46 of the transformer 42 is made very much smaller than the impedance of the parallel filter circuit 60. Furthermore, the output impedances of the winding halves 46 are comparable to the forward impedances of the diodes 52. These two features combine in such a fashion that slight changes in the output impedances of the windings 46 or the forward impedances of the diodes 52 have only negligible effects on the voltage wave form produced across the charging circuit 60. In other words, the impedance of the circuits driving the charging circuit 60 are so small compared to the impedance of the charging circuit, that appreciable changes in the driving circuits have virtually no effect on the wave form across the circuit 60. In practice the resistors 54 serve to properly load and maintain the high frequency response of the transformer 42.

Thus, due to the stabilized characteristics of the amplifier circuit 40 or 140 and the rectifier 50 or 150 in conjunction with the charging circuit 60 or 160, the sawtooth voltage wave form produced across the latter circuit is an accurate representation of the actual magnetic condition of the bridge 20. The remainder of the systems shown in Figs. 1 and 2 allows the full exploitation of the stability and accuracy gained in the early stages 40, 50, and 60, or 140, 150, and 160. Once the sawtooth wave form $G_4$ is obtained across the filter 60 or 160, the A.C. amplifier 70 or 170 amplifies the A.C. components thereof and the band-pass filter 80 or 180 selects the one component whose frequency is equal to the frequency of the oscillator 10 or 110 which component, in accordance with the previous discussion, was indicated to be proportional to the actual net magnetic field existing at the magnetometer element 24 or 124.

From the foregoing description of the invention it is apparent that there has been provided a new type of circuit for detecting and measuring the outputs of unbalanced bridge circuits employing flux-gate magnetometer elements. The invention is also applicable to other types of detecting circuits employing magnetometer elements that are arranged in opposition relationship.

While there is a substantial difference between the embodiments shown in Figs. 1 and 2, they both employ Class A power amplifiers. These amplifiers serve not only to amplify both positive pulses and negative pulses equally, irrespective of variations in the characteristics of the amplifier tubes employed, but, also serve to isolate the bridge circuits from the rectifier circuits. By virtue of this fact any changes that occur in the rectifier circuits while rectifying the positive and negative pulses, do not react upon the bridge circuits to produce distortion or erratic operation.

Although only three specific forms of the invention have been specifically disclosed, it will be clear that the invention is not limited thereto but is capable of a variety of embodiments. Various changes which will now suggest themselves to those skilled in the art may be made in the material, form, details of construction, circuit constants, and connections of circuit elements without departing from the principles of the invention. It is therefore to be understood that the invention is not limited to the specific embodiments thereof disclosed herein, but includes all other embodiments that come within the scope of the appended claims.

The invention claimed is:

1. In a flux-gate magnetometer,

An unbalanced detecting circuit having an input and an output and including a pair of magnetometer elements arranged in opposing relationship therein, Means for applying an alternating current of predetermined frequency to the detecting circuit input whereby positive and negative pulses appear at the detecting circuit output, the difference in amplitudes of said positive and negative pulses varying in accordance with the magnitude of a component of the magnetic field to which the magnetometer elements are exposed, An alternating current amplifier of the Class A type connected to the detector circuit output whereby both positive and negative pulses are amplified substantially equally, And means for detecting the difference in amplitudes between successive pulses of opposite polarity.

2. A flux-gate magnetometer as defined in claim 1 in which said Class A amplifier consists of push-pull cathode-follower amplifier of substantially unity magnification and in which said detecting means comprises input means that forms a balanced cathode-connected load of said amplifier.

3. A flux-gate magnetometer as defined in claim 1 in which said Class A amplifier consists of a single-ended power amplifier and in which said detecting means comprises input means connected in the output of said power amplifier.

4. In a flux-gate magnetometer,

An unbalanced detecting circuit having an input and an output and including a pair of magnetometer elements arranged in opposing relationship therein, Means for applying an alternating current of predetermined frequency to the detecting circuit input whereby positive and negative pulses appear at the detecting circuit output, the difference in amplitudes of said positive and negative pulses varying in accordance with the magnitudes of a component of the magnetic field to which the magnetometer elements are exposed, An alternating current amplifier of the Class A type connected to the detector circuit output whereby both positive and negative pulses are amplified substantially equally, A full-wave rectifier connected to the output of said amplifier for converting positive and negative pulses applied thereto into rectified pulses of the same sign, And means for detecting the difference in amplitudes of successive rectified pulses.

5. In a flux-gate magnetometer:

An unbalanced detecting circuit having an input and an output and including a pair of magnetometer elements arranged in opposing relationship therein;

Means for applying an alternating current of predetermined frequency to the detecting circuit input whereby positive and negative pulses appear at the detecting circuit output, the difference in amplitudes of said positive and negative pulses varying in accordance with the magnitudes of a component of the magnetic field to which the magnetometer elements are exposed;

An alternating current amplifier of the Class A type connected to the detector circuit output whereby both positive and negative pulses are amplified substantially equally;

A full-wave rectifier connected to the output of said amplifier for converting positive and negative pulses applied thereto into rectified pulses of the same sign;

Said rectifier including in its output a charging circuit that converts said rectified pulses into a sawtooth wave, the time constant of said charging circuit being longer than about the time interval between successive pulses;

And means selectively responsive to the component of said sawtooth wave of said predetermined frequency.

6. In a flux-gate magnetometer:

An unbalanced detecting circuit having an input and an output and including a pair of magnetometer elements arranged in opposing relationship therein;

Means for applying an alternating current of predetermined frequency to the detecting circuit input whereby positive and negative pulses appear at the detecting output, the difference in amplitudes of said positive and negative pulses varying in accordance with the magnitudes of a component of the magnetic field to which the magnetometer elements are exposed;

An alternating current amplifier of the Class A type connected to the detector circuit output whereby both positive and negative pulses are amplified substantially equally;

A full-wave rectifier connected to the output of said amplifier for converting positive and negative pulses applied thereto into rectified pulses of the same sign;

Said rectifier including in its output a charging circuit that converts said rectified pulses into a sawtooth wave, the time constant of said charging circuit being longer than about the time interval between successive pulses;

Filtering means connected to said charging circuit and selectively responsive to a component of said sawtooth wave of said predetermined frequency and adapted to attenuate harmonics of said frequency;

A phase detector for combining the filtered wave with a wave of constant amplitude derived from said oscillator to produce a combined wave;

And means responsive to the magnitude of the combined wave.

7. In a flux-gate magnetometer:

An unbalanced detecting circuit having an input and an output and including a pair of magnetometer eltments arranged in opposing relationship therein, said elements being exposed to an ambient magnetic field;

Means for applying an alternating current of predetermined frequency to the detecting circuit input whereby positive and negative pulses appear at the detecting circuit output, the difference in amplitudes of said positive and negative pulses varying in accordance with the magnitude of a component of the net magnetic field to which the magnetometer elements are exposed;

An alternating current amplifier of the Class A type connected to the detector circuit output whereby both positive and negative pulses are amplified substantially equally;

A full-wave rectifier connected to the output of said amplifier for converting positive and negative pulses applied thereto into rectified pulses of the same sign, Said rectifier including in its output a charging circuit that converts said rectified pulses into a sawtooth wave, the time constant of said charging circuit being longer than about the time interval between successive pulses;

Filtering means connected to said charging circuit and selectively responsive to a component of said sawtooth wave of said predetermined frequency and adapted to attenuate harmonics of said frequency; and utilization means controlled by said filtering means.

8. In a flux-gate magnetometer:

An unbalanced detecting circuit having an input and an output and including a pair of magnetometer elements arranged in opposing relationship therein, said elements being exposed to an ambient magnetic field;

Means for applying an alternating current of predetermined frequency to the detecting circuit input whereby positive and negative pulses appear at the detecting circuit output, the difference in amplitudes of said positive and negative pulses varying in accordance with the magnitude of a component of the net magnetic field to which the magnetometer elements are exposed;

An alternating current amplifier of the Class A type connected to the detector circuit output whereby both positive and negative pulses are amplified substantially equally;

A full-wave rectifier connected to the output of said amplifier for converting positive and negative pulses applied thereto into rectified pulses of the same sign;

Said rectifier including in its output a charging circuit that converts said rectified pulses into a sawtooth wave, the time constant of said charging circuit being longer than about the time interval between successive pulses;

A phase detector for combining the filtered wave with a wave of constant amplitude derived from said oscillator to produce a combined wave; and utilization means controlled by said combined wave.

9. In a flux-gate magnetometer:

An unbalanced bridge circuit having an input and an output and including a pair of magnetometer elements in opposing arms thereof;

Means for applying an alternating current of predetermined frequency to the bridge circuit input whereby positive and negative pulses appear at the bridge circuit output, the difference in amplitudes of said positive and negative pulses varying in accordance with the magnitude of a component of the magnetic field to which the magnetometer elements are exposed;

A transformer having a primary winding and a secondary winding, said primary winding being connected across the bridge circuit output;

An alternating current amplifier of the Class A type having said secondary winding connected across its input, said alternating current amplifier being adapted to amplify both positive and negative pulses substantially equally;

And means for detecting the difference in amplitudes between successive pulses.

10. In a flux-gate magnetometer:

An unbalanced bridge circuit having an input and an output and including a pair of magnetometer elements in opposing arms thereof;

Means for applying an alternating current of predetermined frequency to the bridge circuit input whereby positive and negative pulses appear at the bridge circuit output, the difference in amplitudes of said positive and negative pulses varying in accordance with the magnitude of a component of the magnetic field to which the magnetometer elements are exposed;

A transformer having a primary winding and a secondary winding, said primary winding being connected across the bridge circuit output;

An alternating current amplifier of the Class A type having said secondary winding connected across its input, said alternating current amplifier being adapted to amplify both positive and negative pulses substantially equally;

A full-wave rectifier connected to the output of said amplifier for converting positive and negative pulses applied thereto into rectified pulses of the same sign;

And means for detecting the difference in amplitudes of successive rectified pulses.

11. In a flux-gate magnetometer:

An unbalanced bridge circuit having an input and an output and including a pair of magnetometer elements in opposing arms thereof;

Means for applying an alternating current of predetermined frequency to the bridge circuit input whereby positive and negative pulses appear at the bridge circuit output, the difference in amplitudes of said positive and negative pulses varying in accordance with the magnitude of a component of the magnetic field to which the magnetometer elements are exposed;

A transformer having a primary winding and a secondary winding, said primary winding being connected across the bridge circuit output;

An alternating current amplifier of the Class A type having said secondary winding connected across its input, said alternating current amplifier being adapted to amplify both positive and negative pulses substantially equally;

A second transformer having a primary winding and a secondary winding, said primary winding being connected across the output of said alternating current amplifier;

A full-wave rectifier connected to the output of the secondary winding of said second transformer for converting positive and negative pulses applied thereto into rectified pulses of the same sign;

And means for detecting the difference in amplitudes of successive rectified pulses.

12. In a flux-gate magnetometer:

An unbalanced bridge circuit having an input and an output and including a pair of magnetometer elements in opposing arms thereof;

Means for applying an alternating current of predetermined frequency to the bridge circuit input whereby positive and negative pulses appear at the bridge circuit output, the difference in amplitudes of said positive and negative pulses varying in accordance with the magnitude of a component of the magnetic field to which the magnetometer elements are exposed;

A transformer having a primary winding and a secondary winding, said primary winding being connected across the bridge circuit output;

An alternating current amplifier of the Class A type having said secondary winding connected across its input, said alternating current amplifier being adapted to amplify both positive and negative pulses substantially equally;

A second transformer having a primary winding and a secondary winding, said primary winding being connected across the output of said alternating current amplifier;

A full-wave rectifier connected across the secondary winding of said second transformer for converting positive and negative pulses applied thereto into rectified pulses of the same sign;

Said rectifier including in its output a charging circuit that converts said rectified pulses into a sawtooth wave, the time constant of said charging circuit being longer than about the time interval between successive pulses;

Filtering means connected to said charging circuit and selectively responsive to a component of said sawtooth wave of said predetermined frequency and adapted to attenuate harmonics of said frequency;

A phase detector for combining the filtered wave with a wave of constant amplitude derived from said oscillator to produce a combined wave;

And means responsive to the magnitude of the combined wave.

13. In a flux-gate magnetometer:

An unbalanced bridge circuit having an input and an output and including a pair of magnetometer elements in opposing arms thereof;

Means for applying an alternating current of predetermined frequency to the bridge circuit input whereby positive and negative pulses appear at the bridge circuit output, the difference in amplitudes of said positive and negative pulses varying in accordance with the magnitude of a component of the magnetic field to which the magnetometer elements are exposed;

A transformer having a primary winding and a secondary winding, said primary winding being connected across the bridge circuit output;

An alternating current amplifier of the Class A type including an amplifier tube having a grid circuit and a cathode circuit connected thereto, said secondary winding being connected in said grid circuit, said alternating current amplifier being adapted to amplify both positive and negative pulses substantially equally;

A second transformer having a primary winding and a secondary winding, the latter primary winding being connected in said cathode circuit;

A full-wave rectifier connected across the secondary winding of said second transformer for converting positive and negative pulses applied thereto into rectified pulses of the same sign;

And means for detecting the difference in amplitudes of successive rectified pulses.

14. In a flux-gate magnetometer:

An unbalanced bridge circuit having an input and an output and including a pair of magnetometer elements in opposing arms thereof;

Means for applying an alternating current of predetermined frequency to the bridge circuit input whereby positive and negative pulses appear at the bridge circuit output, the difference in amplitudes of said positive and negative pulses varying in accordance with the magnitude of a component of the magnetic field to which the magnetometer elements are exposed;

A transformer having a primary winding and a center-tapped secondary winding, said primary winding being connected across the bridge circuit output;

An alternating current amplifier of the push-pull Class A type, the two halves of said secondary winding being connected across the input to the corresponding halves of said amplifier, said alternating current amplifier being adapted to amplify both positive and negative pulses substantially equally;

A second transformer having a center-tapped primary winding and a secondary winding, the two halves of the latter primary winding being connected across the outputs of corresponding halves of said amplifier;

A full-wave rectifier connected across the secondary winding of said second transformer for converting positive and negative pulses applied thereto into rectified pulses of the same sign;

And means for detecting the difference in amplitudes of successive rectified pulses.

15. In a flux-gate magnetometer:

An unbalanced bridge circuit having an input and an output and including a pair of magnetometer elements in opposing arms thereof;

Means for applying an alternating current of predetermined frequency to the bridge circuit input whereby positive and negative pulses appear at the bridge circuit output, the difference in amplitudes of said positive and negative pulses varying in accordance with the magnitude of a component of the magnetic field to which the magnetometer elements are exposed;

A transformer having a primary winding and a center-tapped secondary winding, said primary winding being connected across the bridge circuit output;

An alternating current amplifier of the push-pull Class A type, each half of said amplifier comprising an amplifier tube having a grid circuit and a cathode circuit connected thereto, the two halves of said secondary winding being connected in the grid circuits of corresponding amplifier tubes, said alternating current amplifier being adapted to amplify both positive and negative pulses substantially equally;

A second transformer having a center-tapped primary winding and a secondary winding, the two halves of the latter primary winding being connected in the cathode circuits of corresponding amplifier tubes;

A full-wave rectifier connected across the secondary winding of said second transformer for converting positive and negative pulses applied thereto into rectified pulses of the same sign;

And means for detecting the difference in amplitudes of successive rectified pulses.

16. In a flux-gate magnetometer:

An unbalanced bridge circuit having an input and an output and including a pair of magnetometer elements in opposing arms thereof, said elements being exposed to an ambient magnetic field;

Means for applying an alternating current of predetermined frequency to the bridge circuit input whereby positive and negative pulses appear at the bridge circuit output, the difference in amplitudes of said positive and negative pulses varying in accordance with the magnitude of a component of the net magnetic field to which the magnetometer elements are exposed;

A transformer having a primary winding and a secondary winding, said primary winding being connected across the bridge circuit output;

An alternating current amplifier of the Class A type including an amplifier tube having a grid circuit and a cathode circuit connected thereto, said secondary winding being connected in said grid circuit, said alternating current amplifier being adapted to amplify both positive and negative pulses substantially equally;

A second transformer having a primary winding and a secondary winding, the latter primary winding being connected in said cathode circuit;

A full-wave rectifier connected across the secondary winding of said second transformer for converting positive and negative pulses applied thereto into rectified pulses of the same sign;

Said rectifier including in its output a charging circuit that converts said rectified pulses into a saw-tooth wave, the time constant of said charging circuit being longer than about the time interval between successive pulses;

Filtering means connected to said charging circuit and selectively responsive to a component of said saw-tooth wave of said predetermined frequency and adapted to attenuate harmonics of said frequency; and utilization means controlled by said filtering means.

17. In a flux-gate magnetometer:

An unbalanced bridge circuit having an input and an output and including a pair of magnetometer elements in opposing arms thereof, said elements being exposed to an ambient magnetic field;

Means for applying an alternating current of predetermined frequency to the bridge circuit input whereby positive and negative pulses appear at the bridge circuit output, the difference in amplitudes of said positive and negative pulses varying in accordance with the magnitude of a component of the net magnetic field to which the magnetometer elements are exposed;

A transformer having a primary winding and a center-tapped secondary winding, said primary winding being connected across the bridge circuit output;

An alternating current amplifier of the push-pull Class A type, each half of said amplifier comprising an amplifier tube having a grid circuit and a cathode circuit connected thereto, the two halves of said secondary winding being connected in the grid circuits of corresponding amplifier tubes, said alternating current amplifier being adapted to amplify both positive and negative pulses substantially equally;

A second transformer having a center-tapped primary winding and a secondary winding, the two halves of the latter primary winding being connected in the cathode circuits of corresponding amplifier tubes;

A full-wave rectifier connected across the secondary winding of said second transformer for converting positive and negative pulses applied thereto into rectified pulses of the same sign;

Said rectifier including in its output a charging circuit that converts said rectified pulses into a saw-tooth wave, the time constant of said charging circuit being longer than about the time interval between successive pulses;

Filtering means connected to said charging circuit and selectively responsive to a component of said saw-tooth wave of said predetermined frequency and adapted to attenuate harmonics of said frequency; and utilization means controlled by said filtering means.

18. In a flux-gate magnetometer:

An unbalanced detecting circuit having an input and an output and including a pair of magnetometer elements arranged in opposing relationship therein, said elements being exposed to an ambient magnetic field;

Means for applying an alternating current of predetermined frequency to the detecting circuit input whereby positive and negative pulses appear at the detecting circuit output, the difference in amplitudes of said positive and negative pulses varying in accordance with the magnitude of a component of the net magnetic field to which the magnetometer elements are exposed;

An alternating current amplifier of the Class A type connected to the detector circuit output whereby both positive and negative pulses are amplified substantially equally;

A full-wave rectifier connected to the output of said amplifier for converting positive and negative pulses applied thereto into rectified pulses of the same sign;

Said rectifier including in its output a charging circuit that converts said rectified pulses into a sawtooth wave the time constant of said charging circuit being longer than about the time interval between successive pulses;

An amplifier connected to amplify said sawtooth wave;

Filtering means connected to said latter amplifier, said filtering means being selectively responsive to components of said sawtooth wave of said predetermined frequency and adapted to attenuate harmonics of said predetermined frequency;

And means for indicating the amplitude of the filtered wave.

19. In a flux-gate magnetometer:

An unbalanced detecting circuit having an input and an output and including a pair of magnetometer elements arranged in opposing relationship therein, said elements being exposed to an ambient magnetic field;

Means for applying an alternating current of predetermined frequency to the detecting circuit input whereby positive and negative pulses appear at the detecting circuit output, the difference in amplitudes of said positive and negative pulses varying in accordance with the magnitude of a component of the net magnetic field to which the magnetometer elements are exposed;

An alternating current amplifier of the Class A type connected to the detector circuit output whereby both positive and negative pulses are amplified substantially equally;

A full-wave rectifier connected to the output of said amplifier for converting positive and negative pulses applied thereto into rectified pulses of the same sign;

Said rectifier including in its output a charging circuit that converts said rectified pulses into a sawtooth wave, the time constant of said charging circuit being longer than about ten times the interval between successive pulses;

An amplifier connected to amplify said sawtooth wave;

Filtering means connected to said latter amplifier, said filtering means being selectively responsive to components of said saw-tooth wave of said predetermined frequency and adapted to attenuate harmonics of said predetermined frequency; and utilization means controlled by said filtering means.

20. In a flux-gate magnetometer:

An unbalanced detecting circuit having an input and an output and including a pair of magnetometer elements arranged in opposing relationship therein;

Means for applying an alternating current of predetermined frequency to the detecting circuit input whereby positive and negative pulses appear at the detecting circuit output, the difference in amplitudes of said positive and negative pulses varying in accordance with the magnitude of a component of the magnetic field to which the magnetometer elements are exposed;

An alternating current amplifier of the Class A type connected to the detector circuit output whereby both positive and negative pulses are amplified substantially equally;

A full-wave rectifier connected to the output of said amplifier for converting positive and negative pulses applied thereto into a pulsating current formed by rectified pulses of the same sign;

And means connected to the output of said full-wave rectifier and selectively responsive to a component of said predetermined frequency in said pulsating current for producing an indication of the magnitude of the magnetic field to which said magnetometer elements are exposed.

21. In a flux-gate magnetometer:

An unbalanced detecting circuit having an input and an output and including a pair of magnetometer elements arranged in opposing relationship therein:

Means for applying an alternating current of predetermined frequency to the detecting circuit input whereby positive and negative pulses appear at the detecting circuit output, the difference in amplitudes of said positive and negative pulses varying in accordance with the magnitude of a component of the magnetic field to which the magnetometer elements are exposed;

An alternating current amplifier of the Class A type connected to the detector circuit output whereby both positive and negative pulses are amplified substantially equally;

A full-wave rectifier connected to the output of said amplifier for converting positive and negative pulses applied thereto into a pulsating current formed by rectified pulses of the same sign;

A filter connected to the output of said rectifier for selectively transmitting to its output a component of said pulsating current of said predetermined frequency;

And means connected to the output of said filter for producing an indication of the magnitude of the magnetic field to which said magnetometer elements are exposed.

22. In a flux-gate magnetometer:

An unbalanced detecting circuit having an input and an output and including a pair of magnetometer elements arranged in opposing relationship therein;

Means for applying an alternating current of predetermined frequency to the detecting circuit input whereby positive and negative pulses appear at the detecting circuit output, the difference in amplitude of said positive and negative pulses varying in accordance with the magnitude of a component of the magnetic field to which the magnetometer elements are exposed;

A cathode-loaded alternating current amplifier including an amplifier tube having a grid circuit and a cathode circuit connected thereto, the output of the detector circuit being impressed upon said grid circuit;

A transformer having a primary winding and a secondary winding, the primary winding being connected in said cathode circuit, whereby both positive and negative pulses applied to said grid circuit are amplified substantially equally;

A full-wave rectifier connected across said secondary winding for converting positive and negative pulses applied thereto into rectified pulses of the same sign;

And means for detecting the difference in amplitudes of successive rectified pulses.

References Cited in the file of this patent

UNITED STATES PATENTS

| | | |
|---|---|---|
| 2,406,870 | Vacquier | Sept. 3, 1946 |
| 2,418,553 | Irwin | Apr. 8, 1947 |
| 2,475,593 | Craddock et al. | July 12, 1949 |
| 2,560,132 | Schmitt | July 10, 1951 |
| 2,642,479 | Jones | June 16, 1953 |
| 2,661,455 | Tickner | Dec. 1, 1953 |
| 2,663,843 | Wickerhan et al. | Dec. 22, 1953 |
| 2,684,465 | Schmitt | July 20, 1954 |
| 2,727,206 | Ryerson | Dec. 13, 1955 |